US012611354B2

(12) United States Patent
Grant

(10) Patent No.: US 12,611,354 B2
(45) Date of Patent: Apr. 28, 2026

(54) WATER-JETTING SEXUAL STIMULATOR

(71) Applicant: Brenika Shakita Grant, Brandon, MS (US)

(72) Inventor: Brenika Shakita Grant, Brandon, MS (US)

( * ) Notice: Subject to any disclaimer, the term of this patent is extended or adjusted under 35 U.S.C. 154(b) by 983 days.

(21) Appl. No.: 17/393,224

(22) Filed: Aug. 3, 2021

(65) Prior Publication Data

US 2022/0031555 A1 Feb. 3, 2022

Related U.S. Application Data

(60) Provisional application No. 63/060,568, filed on Aug. 3, 2020.

(51) Int. Cl.
*A61H 9/00* (2006.01)
*A61H 19/00* (2006.01)
*A61H 23/02* (2006.01)

(52) U.S. Cl.
CPC ........... *A61H 9/0021* (2013.01); *A61H 19/44* (2013.01); *A61H 23/02* (2013.01); *A61H 2201/0153* (2013.01); *A61H 2201/1692* (2013.01); *A61H 2201/5007* (2013.01); *A61H 2201/5025* (2013.01)

(58) Field of Classification Search
CPC ........ A61H 19/44; A61H 23/02; A61H 23/04; A61H 2201/0115; A61H 2201/0153; A61H 9/0021; A61H 9/0028
See application file for complete search history.

(56) References Cited

U.S. PATENT DOCUMENTS

| | | | | |
|---|---|---|---|---|
| 4,313,432 | A | 2/1982 | Sievers | |
| 5,197,459 | A | 3/1993 | Henkin | |
| 2006/0041210 | A1* | 2/2006 | Regey | A61H 19/44 600/38 |
| 2009/0192422 | A1 | 7/2009 | Walker | |
| 2013/0178770 | A1 | 7/2013 | Jutras | |
| 2014/0288467 | A1 | 9/2014 | Heilman | |
| 2014/0309489 | A1* | 10/2014 | Fernandez | A61H 19/44 600/38 |

OTHER PUBLICATIONS

H2O Vibe, http://www.dropofsweden.se/h20-vibe/.

* cited by examiner

*Primary Examiner* — Christine H Matthews

(57) ABSTRACT

A water-jetting sexual stimulator is an apparatus that can be used to have an intense sexually stimulating experience in a safe and comfortable manner. The apparatus may include a stimulator housing, a finger handle, a microcontroller, a portable power source, a water inlet, a water outlet, and a water pump. The stimulator housing enables the apparatus to be maneuvered using a single hand. The stimulator housing is also shaped to provide the greatest stimulation. The finger handle enables the apparatus to be handled using two fingers instead of gripping on the stimulator housing. The microcontroller enables the configuration of the modes of operation of the apparatus. The portable power source provides the voltage necessary for the operation of the microcontroller and the water pump. The water inlet and the water outlet guide the water flow through the water pump. The water pump generates a water jet for greater sexual stimulation.

19 Claims, 9 Drawing Sheets

WATER-JETTING SEXUAL STIMULATOR

The current application claims a priority to the U.S. provisional patent application Ser. No. 63/060,568 filed on Aug. 3, 2020.

FIELD OF THE INVENTION

The present invention generally relates to sex toys and body stimulating devices. More specifically, the present invention provides an adult handheld apparatus designed to promote sexual stimulation using water jets and vibrations.

BACKGROUND OF THE INVENTION

Currently, various sex toys and adult gadgets are available to cater different needs and desires of people. Several of these apparatuses are designed to be used in specific situations. For example, some are manufactured to be waterproof so that the apparatus can be used safely in water. Further, many of these apparatuses come equipped with different stimulation means to further enhance the sexual experience of the user. For example, some provide a vibration feature that can be selectively activated to vibrate the apparatus. Other apparatus provide means to oscillate portions of the apparatus to simulate sexual motions for greater pleasure to the user. However, many of these apparatuses can be hard to use, especially in water. Even the ones designed to be waterproof can be difficult to maneuver in water due to the shape or structure of the apparatus. Therefore, there is a need for a sexual stimulating and waterproof apparatus that can provide multiple stimulation features and has a structure design that is easy to use in wet conditions.

An objective of the present invention is to provide a water-jetting sexual stimulator designed to provide different stimulating features for a greater sexual experience. Another objective of the present invention is to provide a water-jetting sexual stimulator that is easy and comfortable to handle even when submerged in water. Further, another objective of the present invention is to provide a water-jetting sexual stimulator designed to generate a water jet for sexual stimulation. Additional features and benefits are further discussed in the sections below.

SUMMARY OF THE INVENTION

The present invention provides a handheld water-jetting sexual stimulator that intakes liquid, such as water, and expels the liquid through jet-like features. The present invention is portable, handheld, and fully submersible to continuously draw water from any water source using an integrated pumping mechanism. The present invention is constructed to be waterproof so that it can be safely operated in water or other appropriate fluids. In addition, the present invention provides other stimulation features. The present invention provides vibrational feature that generates vibrations to enhance the sexual stimulations from the present invention.

Furthermore, the present invention can be operated in different modes which can be switched as desired to adjust the various settings of the present invention such as water pressure, the water flow, vibration intensity, etc. The user can also select water outflow patterns to choose the frequency of the water outflow through the jet-like features of the present invention. The present invention further includes various physical stimulation features that can be used to increase the stimulating experience of the user, such as multiple ring protrusions.

DETAIL DESCRIPTIONS OF THE INVENTION

Figure 1:
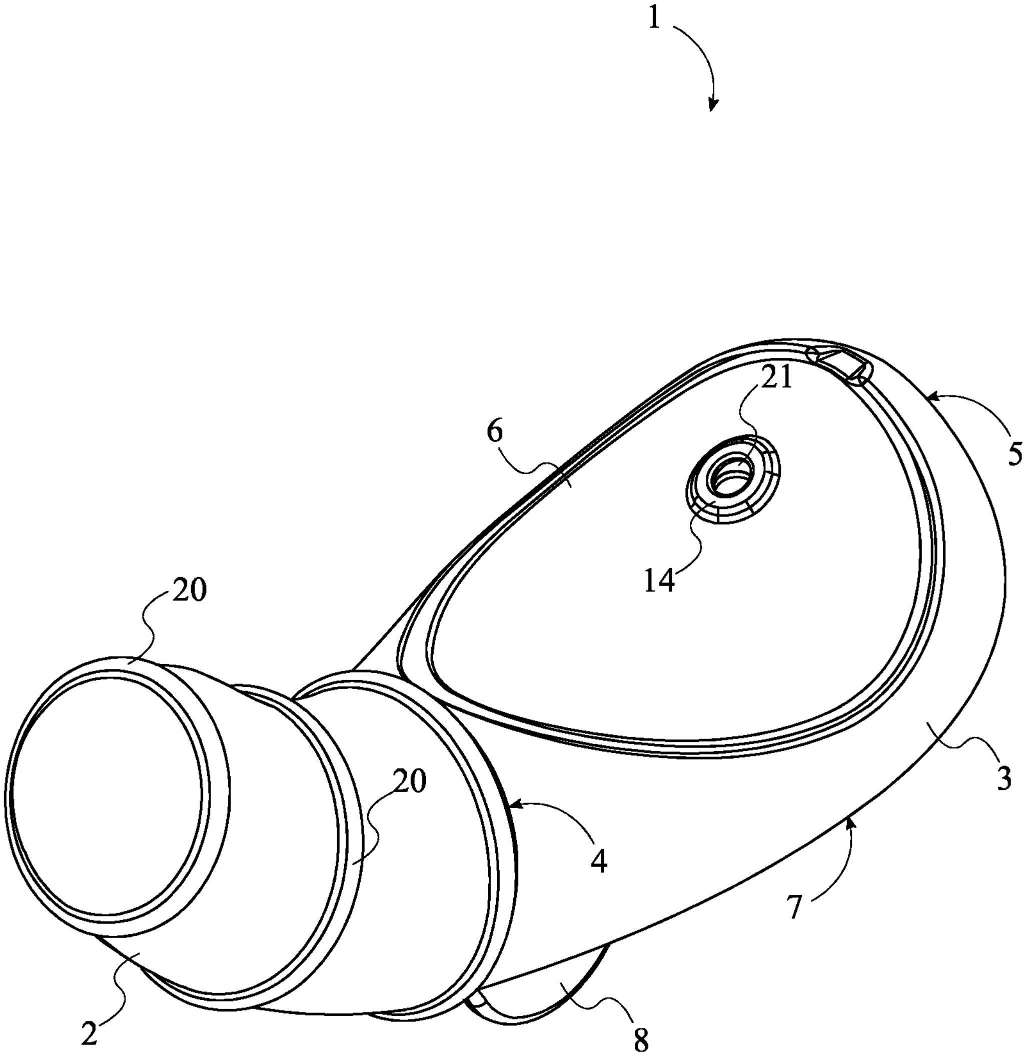
FIG. 1 is a top front perspective view showing the present invention.

All illustrations of the drawings are for the purpose of describing selected versions of the present invention and are not intended to limit the scope of the present invention.

The present invention is a water-jetting sexual stimulator that can be used to have an intense sexually stimulating experience. As can be seen in FIGS. 1, 5, 6, 8, and 9, the present invention may comprise a stimulator housing 1, a finger handle 8, a microcontroller 9, a portable power source 10, a water inlet 13, a water outlet 14, and a water pump 15. The stimulator housing 1 enables the present invention to be comfortably maneuvered using a single hand under water. The stimulator housing 1 is also shaped to provide the greatest sexual stimulation. The finger handle 8 enables the present invention to be handled using two fingers instead of gripping on the stimulator housing 1 directly. The microcontroller 9 facilitates the configuration of the modes of operation of the present invention. The portable power source 10 provides the voltage necessary for the operation of the microcontroller 9 and the water pump 15. The water inlet 13 and the water outlet 14 guide the water flow into and out of the water pump 15, respectively. The water pump 15 generates the necessary water flow to dispense a water jet for greater sexual stimulation.

A general configuration of the aforementioned components enables the user to have an intense stimulating experience in a bathtub or other water environments in a comfortable and safe manner. As can be seen in FIGS. 1 through 4, the stimulator housing 1 is a waterproof IP-68 grade structure with a compact design that is easy to handle and comfortable to use. The stimulator housing 1 can be used as a sex toy due to its overall phallic appearance. The stimulator housing 1 may comprise a phallus-shaped portion 2 and a base portion 3 due to its phallic appearance. The phallus-shaped portion 2 preferably corresponds to the portion that can be used for sexual stimulation, while the base portion 3 can be used to handle the stimulator housing 1. The base portion 3 is preferably an overall cylindrical-shaped structure that can be maneuvered using a single hand. Thus, the base portion 3 comprises a proximal end 4, a distal end 5, a first lateral section 6, and a second lateral section 7. The proximal end 4 and the distal end 5 correspond to the terminal ends of the base portion 3. The first lateral section 6 and the second lateral section 7 preferably correspond to the largest opposing surfaces of the base portion 3. So, the first lateral section 6 and the second lateral section 7 are positioned opposite to each other about the base portion 3. In addition, the phallus-shaped portion 2 is positioned adjacent to the proximal end 4 to form a continuous structure. The finger handle 8 is mounted onto the second lateral section 7 so that the user can maneuver the phallus-shaped portion 2 using only two fingers instead of directly gripping the base portion 3.

Figure 5:
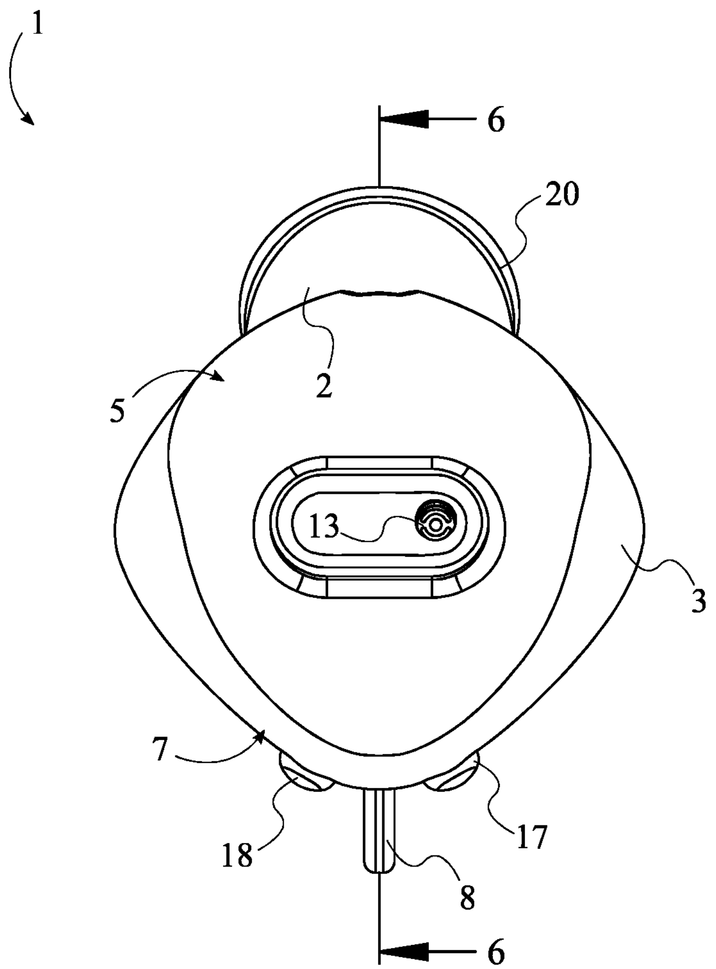
FIG. 5 is a rear-side view showing the present invention.
Figure 6:
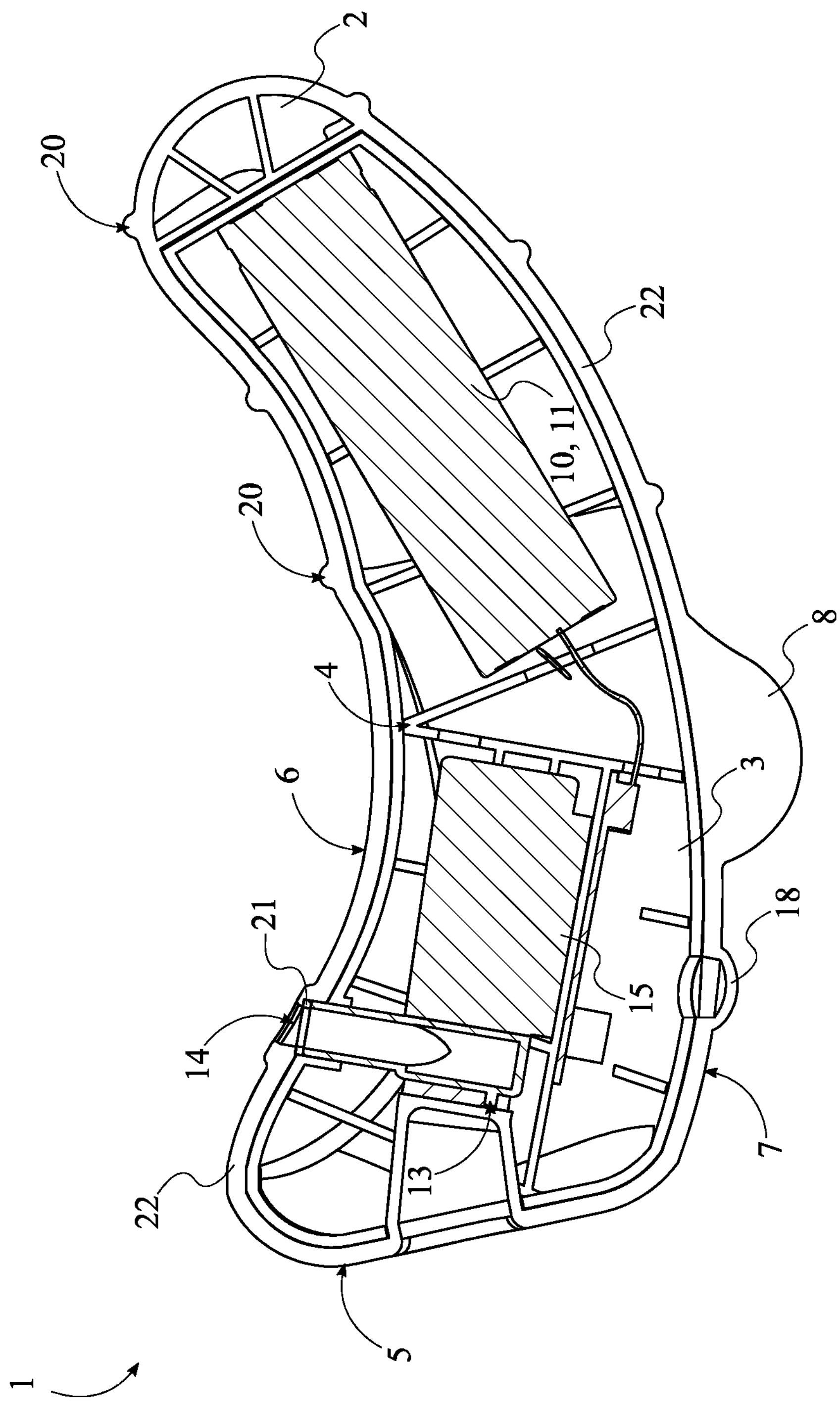
FIG. 6 is a vertical cross-sectional view taken in the direction of line 6-6 in FIG. 5.

Further, as can be seen in FIGS. 5 and 6, the water inlet 13 is integrated into the distal end 5 to guide the water flow towards the water pump 15 within the base portion 3. On the other hand, the water outlet 14 is integrated into the first lateral section 6. The positioning of the water outlet 14 enables the water outflow to be discharged normal to the base portion 3, away from the second lateral section 7. The water inlet 13 is also in fluid communication with the water outlet 14 through the water pump 15 so that the water flow is guided from the water inlet 13, through the water pump 15, and out through the water outlet 14. The microcontroller 9, the portable power source 10, and the water pump 15 are also mounted within the stimulator housing 1 to protect the electrical and electronic components from water damage. Furthermore, the microcontroller 9 is electronically connected to the water pump 15 to configure the mode of operation of the water pump 15. The portable power source 10 is electrically connected to the microcontroller 9 and the water pump 15 to provide the voltage necessary for the operation of the microcontroller 9 and the water pump 15. In other embodiments, multiple water inlets and outlets can be provided to increase the water flow and to discharge the water outflow in multiple directions.

Figure 8:
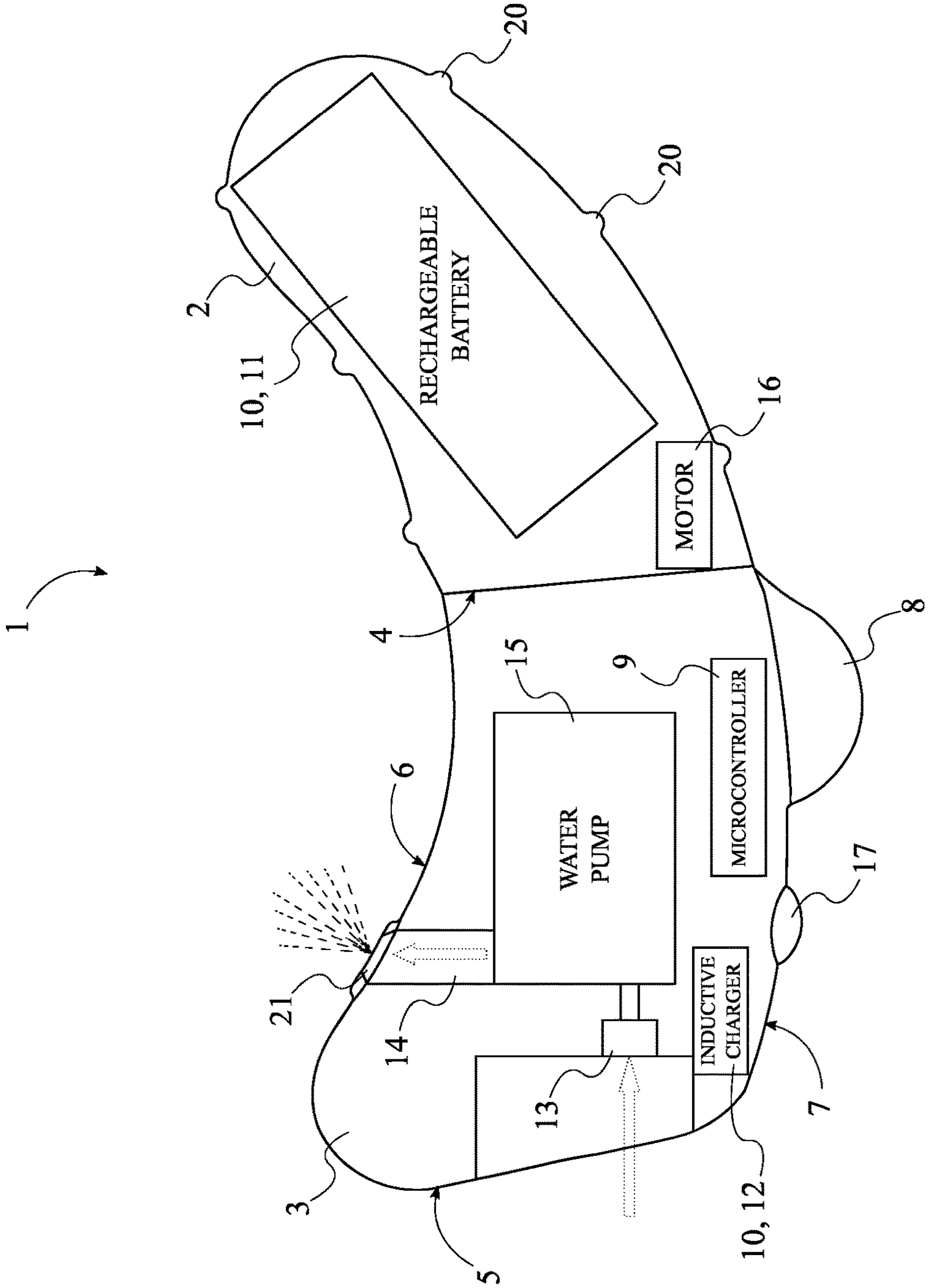
FIG. 8 is a schematic view showing the water flow through the water inlet, the water pump, and the water outlet of the present invention, wherein the water flow is shown as dashed arrows, and wherein the water flow is shown as dashed paths.
Figure 9:
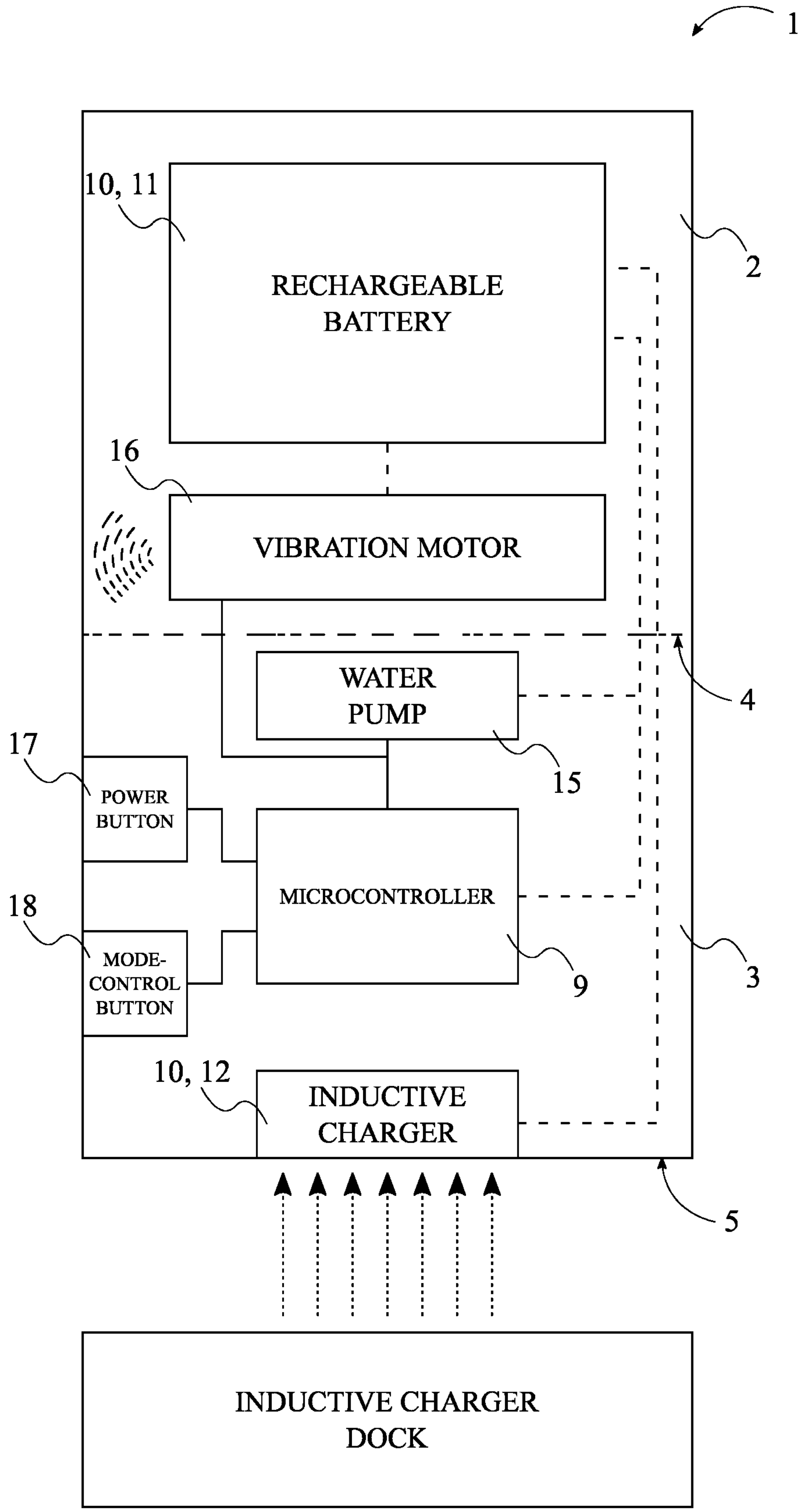
FIG. 9 is a schematic view showing the electrical connections, the electronic connections, and the vibrational connections of the present invention, wherein the electronic connections are shown as solid paths, wherein the electrical connections are shown as dashed paths, and the vibrational connections are shown in curved dashed paths.

In addition to the water stimulating features, the present invention may further a vibration motor 16 to provide vibrational stimulation for greater sexual gratification. As can be seen in FIGS. 8 and 9, the vibration motor 16 is mounted within the base portion 3, adjacent to the proximal end 4, to maintain the vibration motor 16 close to the phallus-shaped portion 2. In addition, the vibration motor 16 is in vibrational communication with the phallus-shaped portion 2 to vibrate the phallus-shaped portion 2. Further, the microcontroller 9 is electronically connected to the vibration motor 16 so that the user can configure the mode of operation of the vibration motor 16. For example, the vibration motor 16 can generate vibrations with different intensities. The portable power source 10 is also electrically connected to the vibration motor 16 to provide the voltage necessary for the operation of the vibration motor 16. In other embodiments, different mechanical means can be used to vibrate or oscillate the phallus-shaped portion 2 and/or the base portion 3.

To make the present invention fully waterproof, the present invention can be charged wirelessly. So, the portable power source 10 may comprise a rechargeable battery 11 and a wireless inductive charger 12, as can be seen in FIGS. 8 and 6. The rechargeable battery 11 enables the user to recharge the present invention for repeated uses. The wireless inductive charger 12 enables the inductive charging of the rechargeable battery 11 to eliminate the need of a charging port. The wireless inductive charger 12 is mounted within the base portion 3, adjacent to the distal end 5, so that the wireless inductive charger 12 is not exposed to the surroundings, especially when submerged in water. The rechargeable battery 11 is mounted within the phallus-shaped portion 2 to isolate the rechargeable battery 11 from the surroundings. The rechargeable battery 11 is also positioned along the phallus-shaped portion 2. This way the rechargeable battery 11 increases the structural strength of the phallus-shaped portion 2 to improve the sexual stimulation to the user when using the phallus-shaped portion 2. Further, the wireless inductive charger 12 is electrically connected to the rechargeable battery 11 to transmit the induced current from the wireless inductive charger 12 to the rechargeable battery 11 to recharge the rechargeable battery 11. In some embodiments, the present invention may include a charging dock with a matching inductive charger that can be engaged with the distal end 5.

Figure 2:
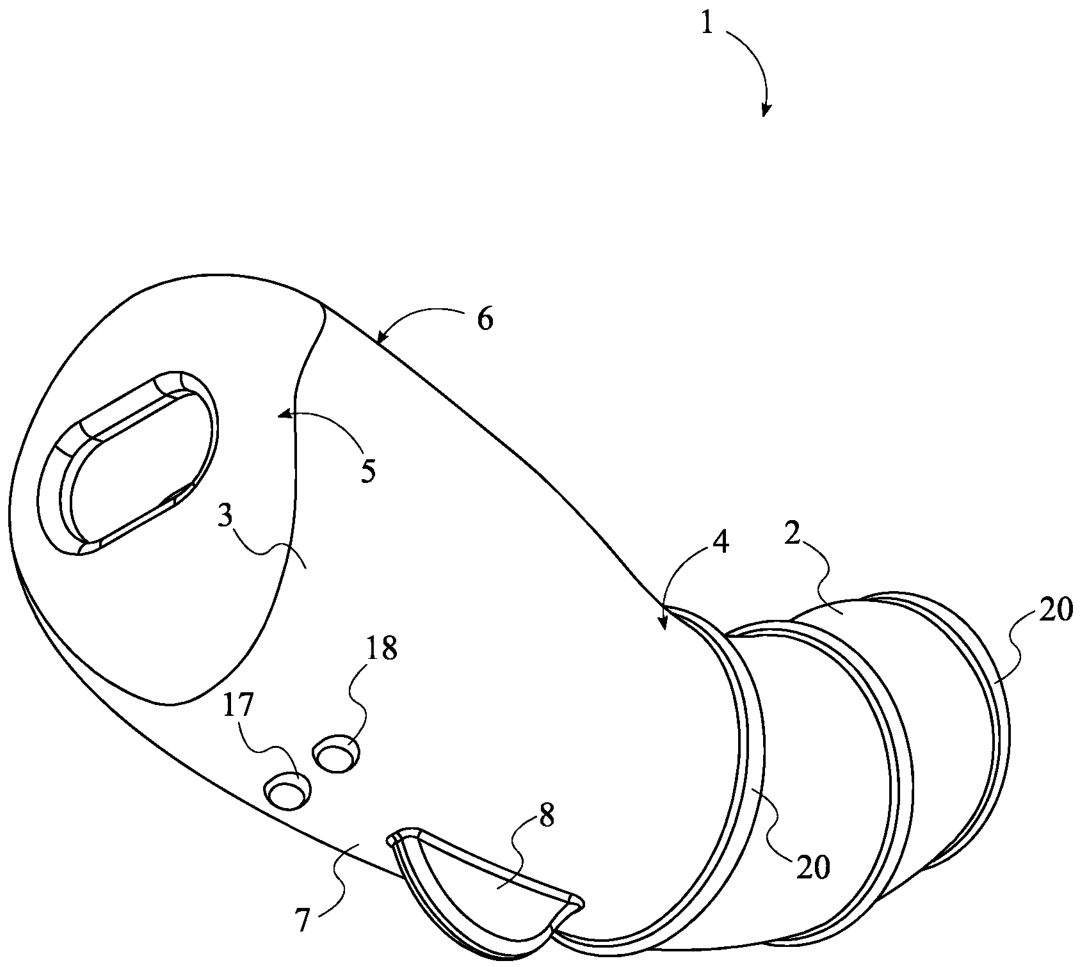
FIG. 2 is a bottom rear perspective view showing the present invention.

The present invention also provides means to control the operation of the water pump 15 and the vibration motor 16. As can be seen in FIGS. 2, 5, and 9, the present invention may further comprise a power button 17 to enable the user to selectively power on or off the water pump 15 and/or the vibration motor 16. The power button 17 is integrated into the second lateral section 7 to maintain the power button 17 accessible to the user and separate from the water outlet 14. The power button 17 is also positioned in between the finger handle 8 and the distal end 5 so that the user can easily engage the power button 17 with a free finger. Further, the power button 17 is electronically connected to the microcontroller 9 to transmit the power signal from the power button 17 to the microcontroller 9. The power button 17 can be configured to transmit different operational signals to the microcontroller 9. For example, the power button 17 can be pressed for one second to turn on the present invention and pressed for three seconds to turn off the present invention. In other embodiments, different switch mechanisms can be used instead of the power button 17.

In addition to the power button 17, the present invention may further comprise at least one mode-control button 18 to select the mode of operation of the water pump 15 and/or the vibration motor 16, as can be seen in FIGS. 2, 5, and 9. Like the power button 17, the at least one mode-control button 18 is integrated into the second lateral section 7 to separate the at least one mode-control button 18 from the water outlet 14. The at least one mode-control button 18 is also positioned in between the finger handle 8 and the distal end 5 so that the at least one mode-control button 18 can be engaged with a finger. Further, the at least one mode-control button 18 is electronically connected to the microcontroller 9. This way the user can select the mode of operation of the water pump 15 and/or the vibration motor 16. For example, the at least one mode-control button 18 enables the user to select between different operational modes such as low-water pressure mode, high-water pressure mode, low vibration mode, high vibration mode, low vibration and low-water pressure mode, and high vibration and high-water pressure mode. In other embodiments, different modes of operation can be configured through additional mode-control buttons.

Figure 7:
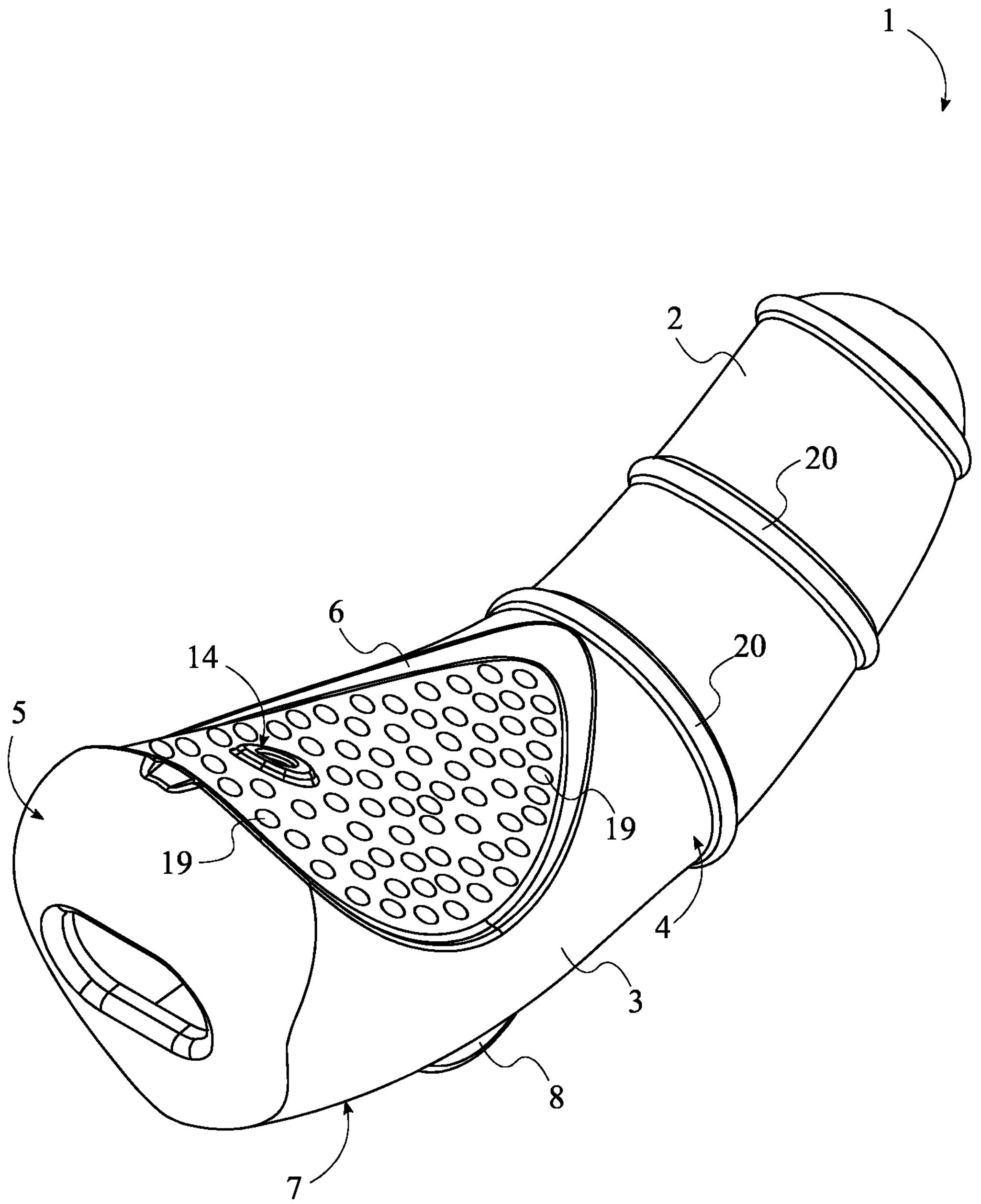
FIG. 7 is a top rear perspective view showing the present invention, wherein the plurality of texture protrusions is shown on the first lateral section.

In some embodiments, the present invention can be used without the vibration motor 16 nor the water pump 15 to have a great stimulating experience. As can be seen in FIG. 7, the present invention may further comprise a plurality of texture protrusions 19 that can be utilized for greater physical stimulation and sexual pleasure. The plurality of texture protrusions 19 is distributed across the first lateral section 6 to cover a larger area of the first lateral section 6. The plurality of texture protrusions 19 is also positioned around the water outlet 14 to not block the water outflow. Further, the plurality of texture protrusions 19 is mounted onto the first lateral section 6 to secure each of the plurality of texture protrusions 19 to the base portion 3. Thus, the user can rub the plurality of texture protrusions 19 against the target body area while the water jet is dispensed through the water outlet 14.

In addition to the plurality of texture protrusions 19, the present invention may further comprise a plurality of annular ribs 20 that enhance the physical stimulating capabilities of the phallus-shaped portion 2. As can be seen in FIGS. 1 through 4, the plurality of annular ribs 20 is distributed along the phallus-shaped portion 2 to cover most of the external surface of the phallus-shaped portion 2. Further, each of the plurality of annular ribs 20 is externally mounted around the phallus-shaped portion 2 to secure each of the plurality of ribs to the phallus-shaped portion 2. Thus, as the phallus-shaped portion 2 is rubbed against the target body area, the plurality of annular ribs 20 increase the friction against the target body area. In other embodiments, other physical features can be provided to be used for greater physical stimulation.

To further improve the sexual stimulating capabilities of the present invention, the present invention may further comprise a jet nozzle 21 that improves the water outflow through the water outlet 14, as can be seen in FIGS. 1 and 8. The jet nozzle 21 is operatively integrated into the water outlet 14, wherein the jet nozzle 21 is used to shape a water jet being ejected from the water outlet 14. For example, the jet nozzle 21 can be fitted into the water outlet 14 so that the water outflow is discharged at greater pressure or velocity. In other embodiments, different types of nozzles can be utilized for different discharging patterns or shapes.

To further improve the waterproof capabilities of the present invention, the present invention may further comprise a waterproof cover 22. As can be seen in FIG. 6, the waterproof cover 22 protects the internal structure of the present invention while also protecting the body parts of the user when the stimulator housing 1 is submerged in water. The waterproof cover 22 can be made of soft material coating, such as medical grade silicone, to not harm the user's body. Further, the stimulator housing 1 is hermetically enclosed by the waterproof cover 22. This way no water enters the stimulator housing 1 except through the water inlet 13 when the stimulator housing is submerged in water. The internal structure of the stimulator housing 1 can also be waterproofed for additional protection to the electronic and electrical components of the present invention.

Figure 3:
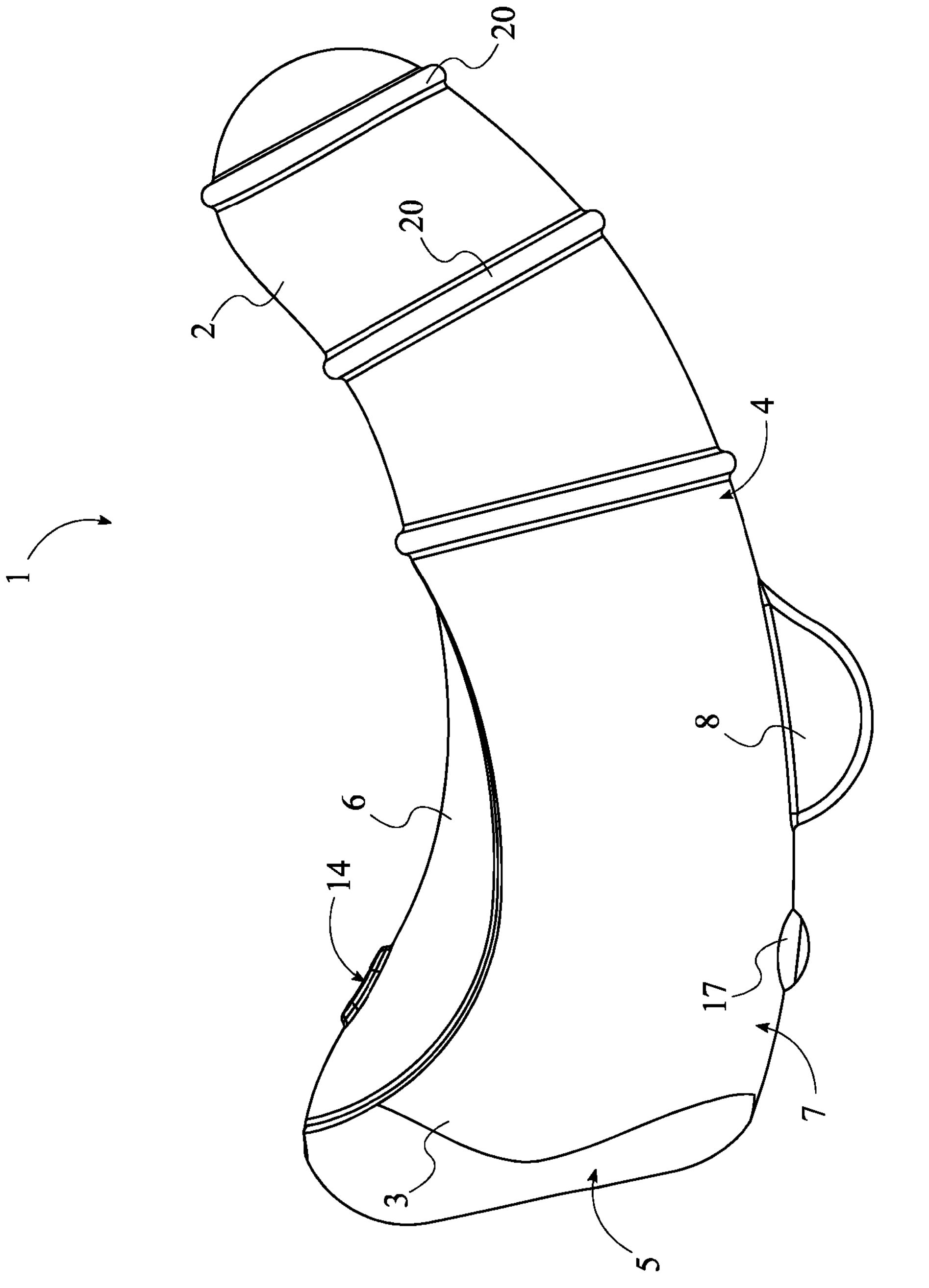
FIG. 3 is a right-side view showing the present invention.
Figure 4:
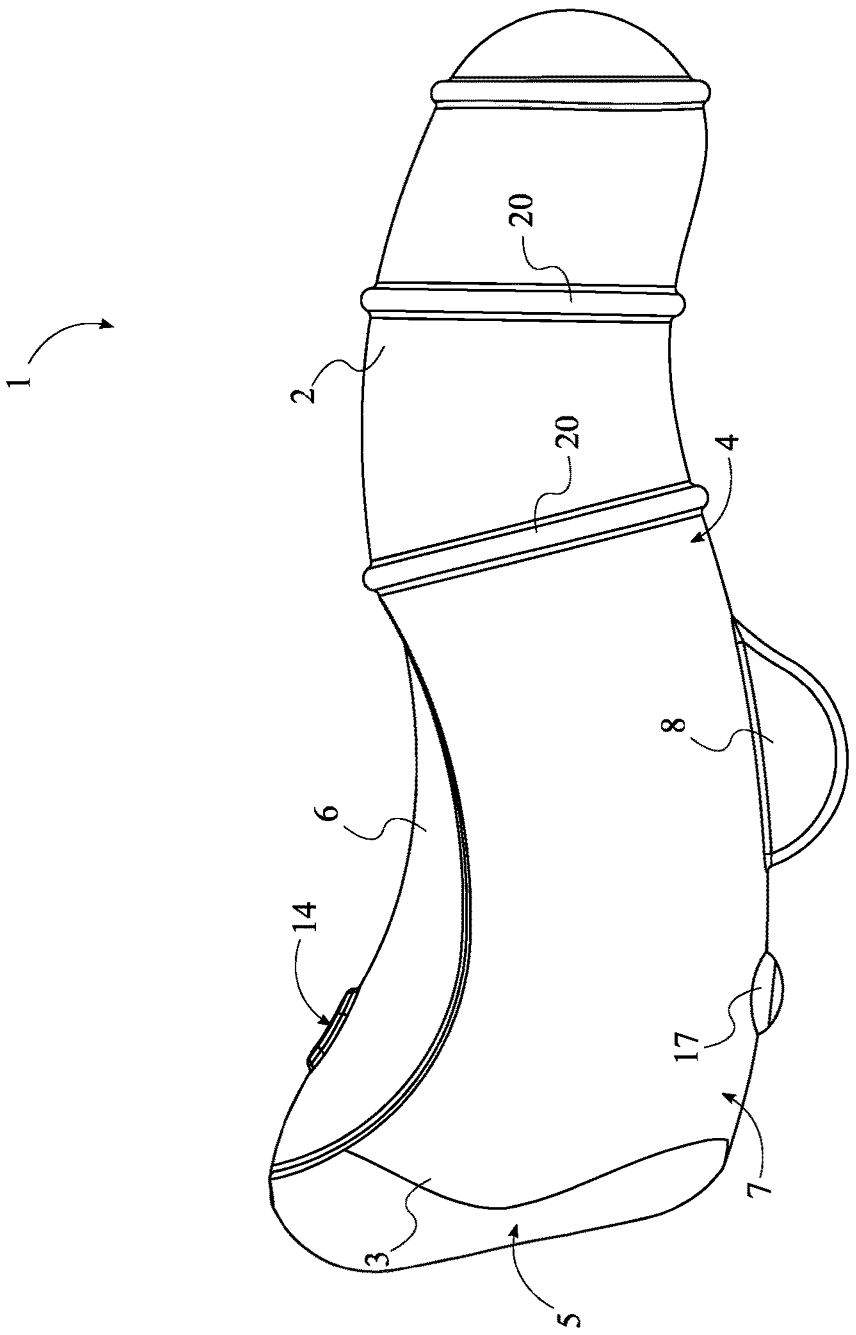
FIG. 4 is a right-side view showing the present invention, wherein the phallus-shaped portion is shown bent downwards.

As can be seen in FIGS. 3 and 4, to make the present invention as comfortable as possible when used with delicate body parts, such as the user's genitals, the phallus-shaped portion 2 is preferably made from a soft flexible material. This enables the phallus-shaped portion 2 to bend when pressed against different body parts and not hurt the user. In addition, the base portion 3 is designed to match the shape of the phallus-shaped portion 2. So, the base portion 3 tapers from the distal end 5 to the proximal end 4. This results in a smooth and continuous shape that is comfortable to maneuver and use in the user's body. Further, the first lateral section 6 is a recessed flat surface within the base portion 3 that can be used for greater maneuverability of the stimulator housing 1. In other embodiments, the stimulator housing 1 can be modified to accommodate different sexual needs.

Although the invention has been explained in relation to its preferred embodiment, it is to be understood that many other possible modifications and variations can be made without departing from the spirit and scope of the invention.

What is claimed is:

1. A water-jetting sexual stimulator comprising:
a stimulator housing;
a finger handle;
a microcontroller;
a portable power source;
a water inlet;
a water outlet;
a water pump;
a vibration motor;
the stimulator housing comprising a phallus-shaped portion and a base portion;
the base portion comprising a proximal end, a distal end, a first lateral section, and a second lateral section;
the first lateral section and the second lateral section being positioned opposite to each other about the base portion;
the phallus-shaped portion being positioned adjacent to the proximal end;
the finger handle being mounted onto the second lateral section;
the water inlet being integrated into the distal end;
the water outlet being integrated into the first lateral section;
the water inlet being in fluid communication with the water outlet through the water pump;
the microcontroller, the portable power source, and the water pump being mounted within the stimulator housing;
the microcontroller being electronically connected to the water pump;
the portable power source being electrically connected to the microcontroller and the water pump;
the vibration motor being mounted within the base portion, adjacent to the proximal end;
the vibration motor being in vibrational communication with the phallus-shaped portion;
the microcontroller being electronically connected to the vibration motor; and,
the portable power source being electrically connected to the vibration motor.

2. The water-jetting sexual stimulator as claimed in claim 1 comprising:
the portable power source comprising a rechargeable battery and a wireless inductive charger;
the wireless inductive charger being mounted within the base portion, adjacent to the distal end;
the rechargeable battery being mounted within the phallus-shaped portion;
the rechargeable battery being positioned along the phallus-shaped portion; and,
the wireless inductive charger being electrically connected to the rechargeable battery.

3. The water-jetting sexual stimulator as claimed in claim 1 comprising:
a power button;
the power button being integrated into the second lateral section;
the power button being positioned in between the finger handle and the distal end; and,
the power button being electronically connected to the microcontroller.

4. The water-jetting sexual stimulator as claimed in claim 1 comprising:

at least one mode-control button;

the at least one mode-control button being integrated into the second lateral section;

the at least one mode-control button being positioned in between the finger handle and the distal end; and, the at least one mode-control button being electronically connected to the microcontroller.

5. The water-jetting sexual stimulator as claimed in claim 1 comprising:

a plurality of texture protrusions;

the plurality of texture protrusions being distributed across the first lateral section;

the plurality of texture protrusions being positioned around the water outlet; and, the plurality of texture protrusions being mounted onto the first lateral section.

6. The water-jetting sexual stimulator as claimed in claim 1 comprising:

a plurality of annular ribs;

the plurality of annular ribs being distributed along the phallus-shaped portion; and, each of the plurality of ribs being externally mounted around the phallus-shaped portion.

7. The water-jetting sexual stimulator as claimed in claim 1 comprising:

a jet nozzle; and, the jet nozzle being operatively integrated into the water outlet, wherein the jet nozzle is used to shape a water jet being ejected from the water outlet.

8. The water-jetting sexual stimulator as claimed in claim 1 comprising:

a waterproof cover; and, the stimulator housing being hermetically enclosed by the waterproof cover.

9. The water-jetting sexual stimulator as claimed in claim 1, wherein the phallus-shaped portion is made from a soft flexible material.

10. The water-jetting sexual stimulator as claimed in claim 1, wherein the base portion tapers from the distal end to the proximal end.

11. The water-jetting sexual stimulator as claimed in claim 1, wherein the first lateral section is a recessed flat surface within the base portion.

12. A water-jetting sexual stimulator comprising:

a stimulator housing;

a finger handle;

a microcontroller;

a portable power source;

a water inlet;

a water outlet;

a water pump;

a vibration motor;

the stimulator housing comprising a phallus-shaped portion and a base portion;

the base portion comprising a proximal end, a distal end, a first lateral section, and a second lateral section;

the portable power source comprising a rechargeable battery and a wireless inductive charger;

the first lateral section and the second lateral section being positioned opposite to each other about the base portion;

the phallus-shaped portion being positioned adjacent to the proximal end;

the finger handle being mounted onto the second lateral section;

the water inlet being integrated into the distal end;

the water outlet being integrated into the first lateral section;

the water inlet being in fluid communication with the water outlet through the water pump;

the microcontroller, the portable power source, and the water pump being mounted within the stimulator housing;

the microcontroller being electronically connected to the water pump;

the portable power source being electrically connected to the microcontroller, and the water pump;

the wireless inductive charger being mounted within the base portion, adjacent to the distal end;

the rechargeable battery being mounted within the phallus-shaped portion;

the rechargeable battery being positioned along the phallus-shaped portion; and, the wireless inductive charger being electrically connected to the rechargeable battery.

13. The water-jetting sexual stimulator as claimed in claim 12 comprising:

a vibration motor;

the vibration motor being mounted within the base portion, adjacent to the proximal end;

the vibration motor being in vibrational communication with the phallus-shaped portion;

the microcontroller being electronically connected to the vibration motor; and, the portable power source being electrically connected to the vibration motor.

14. The water-jetting sexual stimulator as claimed in claim 12 comprising:

a power button;

at least one mode-control button;

the power button being integrated into the second lateral section;

the power button being positioned in between the finger handle and the distal end;

the power button being electronically connected to the microcontroller;

the at least one mode-control button being integrated into the second lateral section;

the at least one mode-control button being positioned in between the finger handle and the distal end; and, the at least one mode-control button being electronically connected to the microcontroller.

15. The water-jetting sexual stimulator as claimed in claim 12 comprising:

a plurality of texture protrusions;

a plurality of annular ribs;

the plurality of texture protrusions being distributed across the first lateral section;

the plurality of texture protrusions being positioned around the water outlet;

the plurality of texture protrusions being mounted onto the first lateral section;

the plurality of annular ribs being distributed along the phallus-shaped portion; and, each of the plurality of ribs being externally mounted around the phallus-shaped portion.

16. The water-jetting sexual stimulator as claimed in claim 12 comprising:

a jet nozzle;

a waterproof cover;

the jet nozzle being operatively integrated into the water outlet, wherein the jet nozzle is used to shape a water jet being ejected from the water outlet; and, the stimulator housing being hermetically enclosed by the waterproof cover.

17. The water-jetting sexual stimulator as claimed in claim 12, wherein the phallus-shaped portion is made from a soft flexible material.

18. The water-jetting sexual stimulator as claimed in claim 12, wherein the base portion tapers from the distal end to the proximal end.

19. The water-jetting sexual stimulator as claimed in claim 12, wherein the first lateral section is a recessed flat surface within the base portion.

* * * * *